(12) United States Patent
Hardy et al.

(10) Patent No.: US 8,582,767 B1
(45) Date of Patent: Nov. 12, 2013

(54) CRYPTOGRAPHIC DEVICE SHARING AMONG A PLURALITY OF COMMUNICATION LINKS

(76) Inventors: Charles C. Hardy, Sandy, UT (US); Thomas R. Giallorenzi, Sandy, UT (US); Jami R. Smith, Farmington, UT (US); Ralph E. Carson, Bountiful, UT (US); Scott A. Jansa, Sandy, UT (US)

( * ) Notice: Subject to any disclaimer, the term of this patent is extended or adjusted under 35 U.S.C. 154(b) by 301 days.

(21) Appl. No.: 12/891,158

(22) Filed: Sep. 27, 2010

(51) Int. Cl.
*H04L 29/06* (2006.01)
*H04L 9/32* (2006.01)
*H04N 1/44* (2006.01)

(52) U.S. Cl.
USPC ........... 380/255; 380/244; 713/153; 713/162; 713/168

(58) Field of Classification Search
USPC .................. 380/255, 244; 713/155, 162, 168
See application file for complete search history.

(56) References Cited

U.S. PATENT DOCUMENTS

| | | | |
|---|---|---|---|
| 2,405,500 A | 8/1946 | Guanella | |
| 4,160,120 A | 7/1979 | Barnes et al. | |
| 4,509,170 A * | 4/1985 | Hollinger et al. | 370/458 |
| 4,591,660 A | 5/1986 | Scordo | |
| 4,905,234 A * | 2/1990 | Childress et al. | 370/349 |
| 5,161,189 A | 11/1992 | Bray et al. | |
| 5,541,995 A | 7/1996 | Normile et al. | |
| 6,249,582 B1 | 6/2001 | Gilley | |
| 6,324,178 B1 * | 11/2001 | Lo et al. | 370/392 |
| 6,768,728 B1 * | 7/2004 | Kim et al. | 370/342 |
| 7,095,856 B2 | 8/2006 | Logalbo et al. | |
| 7,139,869 B2 * | 11/2006 | Parry et al. | 711/110 |
| 7,505,535 B2 * | 3/2009 | Ha et al. | 375/340 |
| 8,254,841 B2 * | 8/2012 | Friedrich | 455/41.2 |

* cited by examiner

*Primary Examiner* — Mohammad W Reza
(74) *Attorney, Agent, or Firm* — Kirton McConkie

(57) ABSTRACT

A self-synchronizing cryptographic device can be shared among a plurality of communications links. Blocks of data can be transferred to the cryptographic device, wherein each block of data includes a head portion which is the tail portion of a previous block of data for the same communication link. The head/tail portion is sufficient to reestablish cryptographic synchronization of the cryptographic device.

27 Claims, 4 Drawing Sheets

CRYPTOGRAPHIC DEVICE SHARING AMONG A PLURALITY OF COMMUNICATION LINKS

FIELD

The present application relates to cryptographic systems. More particularly, the present application relates to sharing a cryptographic device among a plurality of communications links.

BACKGROUND

Many communications system use encryption to protect communicated data from unauthorized interception. In an encryption system, the message to be hidden (sometimes called "plaintext") is modified in a reversible way (by a process sometimes referred to as "encryption" which can be performed by an "encrypter") such that the substance of the message is hidden. The resulting encrypted message (sometimes called "ciphertext") can then be transmitted across an unsecured (e.g., subject to eavesdropping or interception) channel. Upon reception, the original message is recovered by reversing the modification (by a process sometimes referred to as "decryption" which can be performed by a "decrypter"). To ensure that only the desired recipient can properly decrypt the encrypted message, some aspect of the encryption algorithm is kept secret. Typically, the encryption algorithm operates using a secret key, while the details of the algorithm may be publicly disclosed. Keys are distributed through various means to the users authorized to transmit/receive encrypted communications, and users may have one or more different keys. Some variations on this basic process (e.g., "public key" cryptosystems) can also be used.

In some circumstances, multiple encrypted communications links may need to be processed. For example, a multiplexed stream of data may include data for multiple users. If the multiplexed stream of data was encrypted using a single encrypter after it was multiplexed together, the resulting ciphertext stream can be decrypted and then demultiplexed. In other words, the encryption and decryption process is common for all users. Such a technique, however, provides limited flexibility.

In other circumstances, multiple encrypted communications links may each use their own associated encryption. Generally, the communications streams must be separately decrypted by corresponding decrypters. A communications node which uses many communications links may therefore include a large number of decrypters. This can result in undesirable size, weight, and power consumption.

SUMMARY

In some embodiments of the invention, a system for sharing a cryptographic device among a plurality of communications links is provided. The system can include an interface to a self-synchronizing cryptographic device. A means for buffering data can also be provided. Coupled to the means for buffering data can be a means for writing blocks of input data and a means for reading blocks of output data. Input data for a plurality of communications links can be written into the means for buffering data by the means for writing. Output data for the plurality of communications links can be read from the means for buffering data by the means for reading and transferred to the interface. For each communications link, a head portion of each block of output data for the communication link can be a repeat of a tail portion of a preceding block of output data for the same communication link. The data quantity of the head portion can be sufficient to reestablish synchronization of the cryptographic device.

In some embodiments of the invention, a system for sharing a cryptographic device among a plurality of communications links is provided. The system includes an interface to the cryptographic device. The system also includes a data buffer having an input and an output, and the output can be coupled to the interface. A plurality of data pointers point into the data buffer, and a read pointer and a write pointer can be defined for each one of a plurality of communications links. When writing data from a communications link into the data buffer, the write pointer can be advanced by N locations for each block of N data elements input into the data buffer. When transferring data from the data buffer to the interface, the read pointer can be advanced by M-X locations for each block of M data elements output, wherein X is a number of data elements sufficient to reestablish synchronization of the cryptographic device.

In some embodiments, a method of sharing a cryptographic device among a plurality of communications links is provided. The method can include obtaining a self synchronizing cryptographic device. Another operation in the method can be buffering data for a plurality of communications links within a memory. The method can include transferring a first set of data corresponding to a first one of the communications links to the cryptographic device. A tail portion of the first set of data can be held in the memory after being provided to the cryptographic device. Another operation can be transferring additional data corresponding to a second one of the communications links to the cryptographic device. Yet another operation can be transferring a second set of data corresponding to the first one of the communications links to the cryptographic device. A head portion of the second set of data can be the tail portion of the first set of data, having been held in the memory. The data quantity of the head portion can be sufficient to reestablish cryptographic synchronization of the cryptographic device.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
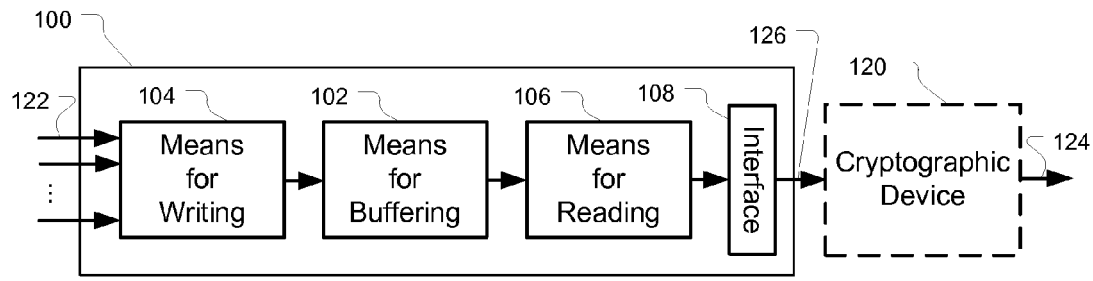
FIG. 1 is a block diagram of an example of a system for sharing a cryptographic device among a plurality of communications links in accordance with some embodiments of the present invention.

Reference will now be made to the example embodiments illustrated in the drawings, and specific language will be used herein to describe the same. These examples, including particular implementation details and parameters are for nonlimiting illustration only. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used: The singular forms "a," "an," and "the" include plural referents unless the context clearly dictates otherwise. Thus, for example, reference to a communications link includes reference to one or more communications links.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, the time at which two events occur may be substantially the same even though the exact time of the two events differs slightly due to digital clock jitter or noise, signal propagation delay, or similar factors.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all the individual numerical values or subranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

Turning to FIG. 1, a system is illustrated in accordance with some embodiments of the present invention. The system, shown generally at 100, can be used for sharing a cryptographic device 120 among a plurality of communications links 122. Data for the plurality of communications link may be provided by a plurality of separate lines, as shown here, or may be provided by a single line (e.g., in a multiplexed or time shared manner). The communications links can be, for example, wired links or wireless links (e.g., radio or optical). The cryptographic device can be a decrypter, for which the incoming data from the communications links is encrypted data (ciphertext), in which case the decrypter decrypts the data and outputs unencrypted data (plaintext) 124. The plaintext can be output from the cryptographic device into a single buffer (with plaintext for multiple links stored within the buffer) or into multiple buffers (with a separate buffer dedicated to each different communications links).

The cryptographic device 120 is shown in dotted lines since it need not be a part of the system. For example, in some applications, cryptographic devices are easily installed and removed from communications node equipment to facilitate physically handling the devices in a security-controlled manner. As a specific example, the cryptographic device can be a type 1 device (a device which has been approved by the National Security Agency (NSA) for the encryption/decryption of classified information). Other types of cryptographic devices can be used as well, including devices compatible with the Advanced Encryption Standard (AES) and other cryptographic standards.

The system can include a means 102 for buffering data. For example, the means for buffering data can be memory device as described in further examples below. The data for the communications links can be accepted and stored into the means for buffering by a means 104 for writing blocks of data into the means for buffering. For example, blocks of data received for each of the communications links can be written into the means for buffering according to various rules as described in further examples below. A means 106 for reading blocks of output data from the means for buffering can transfer data to an interface 108 to the cryptographic device, which in turn can provide the data to an input 126 of the cryptographic device. The cryptographic device 120 can be a self-synchronizing decrypter. A self-synchronizing decrypter is one for which the decrypter will (when using the correct key) automatically synchronize with the ciphertext stream and begin outputting plaintext after a predefined data quantity of ciphertext has been processed. The predefined data quantity can be a number of data elements (e.g., bits) for which the cryptographic device is known to achieve synchronization. The predefined data quantity can be larger than an actual number of data elements required by the cryptographic device to achieve synchronization, as the actual number may be not be explicitly defined or published.

The system 102 can thus share a single cryptographic device 120 among a number of communications links 122 as follows. The means 106 for reading blocks of output data can provide blocks of output data to the interface to the cryptographic device that each include a head portion and a tail portion. For a given communications link, the head portion of each block of data can be a repeat of the tail portion of a preceding block of output data for that communication link. The amount of data in the head (and tail) portion of the output data blocks can be sufficient to re-establish synchronization of the cryptographic device. For example, for a cryptographic device requiring 100 bits of data to resynchronize, the head (and tail) portion can be 100 bits or greater. The total block size can be any suitable value. For example, the block size can be 1000 bits. The block size need not be constant, as described in further examples below.

The communications links 122 can share the same key. Alternatively, some communications links can use a different key than other communications links, including for example, where each communications link uses a different key. If communications links use different keys, the cryptographic device 120 can also have the correct key loaded prior to processing each block. For example, the system 100 can include storage (not shown) for keys associated with the communications links, and prior to providing each block of data to the cryptographic device, the correct key can be loaded through a key interface (not shown) to the cryptographic device. Alternatively, the cryptographic device may include storage for multiple keys, and an interface (not shown) to the cryptographic device can be controlled by the system to select the correct key for each block. Additional control signals (not shown) can be exchanged between the system and the cryptographic device to ensure that the cryptographic device is in a desired state (e.g., to ensure that a key has been loaded and validated before associated data is transferred to the cryptographic device).

Figure 2:
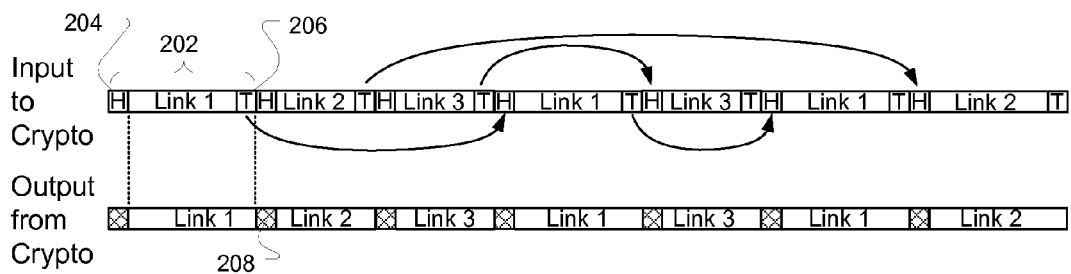
FIG. 2 is a timing diagram showing an example of input ciphertext and output plaintext from a shared cryptographic device in accordance with some embodiments of the present invention.

FIG. 2 provides an example of data for a number of communications links being processed by a cryptographic device. Data blocks (e.g., data block 202 for link 1) each include a head portion (e.g., head portion 204) and tail portion (e.g., tail portion 206). As shown by pointers, the head portions of each block are repeats of tail portions of previous blocks corresponding to the same communications link (e.g., link 1, link 2, . . . ).

As processing a data block from one link is completed, the decrypted plaintext data for that link can be output from the cryptographic device. Upon switching to the block for the next link, the initial output of the cryptographic device while processing the head portion may be garbage 208 until the cryptographic device has reestablished synchronization. This garbage data can be discarded. Because the head portion is previously processed data no plaintext data is lost. Following processing of the head portion, the cryptographic device will be resynchronized, and thus ready to continue where it left off from the previous block of data for that communications link. Thus, the remainder of the data block can be processed for that communication link and the decrypted plaintext data can be output. Thus, between the blocks of valid plaintext data for each link will be garbage which can be discarded.

As a specific example, consider a block size of 110 bits, where the resynchronization period is 10 bits. Thus, the first block passed to the cryptographic device for link 1 can include a tail portion ciphertext bits $c101$-$c110$. Upon processing, the cryptographic device can output decrypted plaintext bits $d11$-$d110$. In the second block for link 1 (which corresponds to plaintext bits $d100$-$d210$), the head portion can include a repeat of ciphertext bits $c101$-$c110$, followed by ciphertext bits $c111$-$c200$, and tail portion $c201$-$c211$. Upon processing the head portion $c100$-$c110$, the cryptographic device establishes synchronization, after which the cryptographic device can decrypt and output plaintext data bits $d111$-$d210$ correctly, hence, no data need be lost. Note that any desired number of blocks for any desired number of other communications links can be processed in between the first block for link 1 and the second block for link 1.

This technique provides several advantages over alternate approaches to sharing a cryptographic device. For example, since self-synchronizing is used, no special synchronization data needs to be sent over the communications links. This can help to provide high throughput, since overhead for synchronization subtracts from bandwidth that could otherwise be used for transferring user data. Moreover, this can avoid adding any complexity to the transmitters to support the shared usage at the receiver. This can assist with adding capabilities to existing, fielded systems. Because the self-synchronizing is performed by repeating previously processed data, it can be performed without regard to any block boundaries or other synchronization of the communications links. This is beneficial for several reasons. First, in the case where the input data from the communications links is ciphertext, block boundaries within the data may not be discernable. Second, block sizes used for input and output can be selected to be convenient sizes. Thus, switching from processing one communications link to another need not be synchronized. Third, this approach can provide a simple and elegant implementation, particularly when the communications links operate at differing data rates relative to each other, or when a particular communications link has a varying data rate as illustrated by further examples below.

Figure 3:
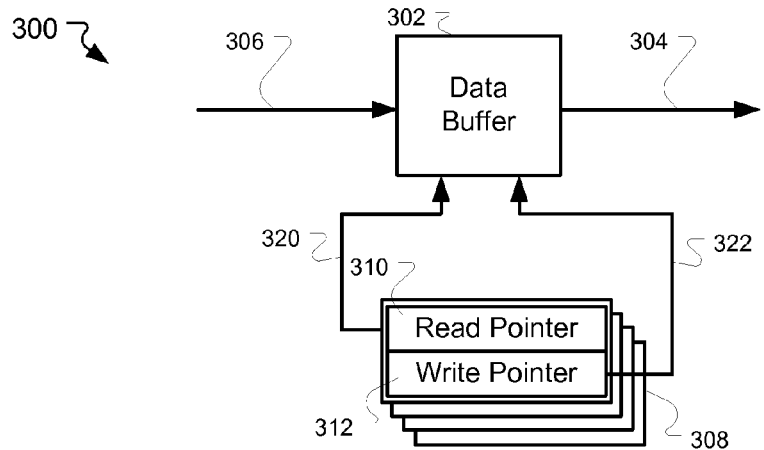
FIG. 3 is a block diagram of another example of a system for sharing a cryptographic device among a plurality of communications link in accordance with some embodiments of the invention.

FIG. 3 illustrates a detailed example of an embodiment of a system for sharing a cryptographic device. The system 300 can include a data buffer 302, which can for example be a memory. The data buffer can thus be an example of a means for buffering data. The data buffer can have an output coupled to an interface 304 to a cryptographic device. If desired, the system can include the cryptographic device. For example, the cryptographic device can be like cryptographic device 120 described above (e.g., a self-synchronizing cryptographic device). The output can provide data to the cryptographic device. The data buffer can also have an input 306 which accepts input data from a plurality of communications links. For example, the communications links can be like the communications links 122 described above.

A plurality of data pointers 308 can point into the data buffer 302. For each one of the plurality of communications links, a read pointer 310 and a write pointer 312 can be defined. The read pointer and the write pointer can point to particular data storage locations within the data buffer (e.g., providing read address 320 and write address 322). For example, the read pointer can point to a next memory location (or, alternatively, a current memory location) from which data is to be read for output to the cryptographic device. For example, the write pointer can point to a next memory location (or, alternatively, a current memory location) to which data is to be written for input from the communications links. The read pointer and write pointer can be pre-incremented or post-incremented when performing read/write operations into the data buffer.

For data being written into the data buffer 302, the write pointer 312 can be advanced by N locations for each block of N data elements input into the data buffer. The write pointer can be an example of a means for writing blocks of input data. For example, N data elements corresponding to a first communications link can be written into sequential memory locations within the data buffer and the write pointer advanced by N locations (e.g., incrementing by one before or after each data element is written, or alternatively incrementing by N after all data elements have been written).

For data being read from the data buffer 302, the read pointer 310 can be advanced by M-X locations for each block of M data elements output from the data buffer. The read pointer can be an example of a means for reading blocks of output data. The value of X can correspond to a number of data elements sufficient to reestablish synchronization of the cryptographic device. For example, M data elements corresponding to a first communications link can be read from sequential memory locations within the data buffer, and the read pointer advanced by M-X locations (e.g., incrementing by one before or after each data element is read and then moved back by X, incrementing by one before of after some data elements are read, or alternatively incrementing by M-X after all data elements have been read). By only moving the read pointer by M-X for each M elements read, upon the next reading of data for that communications link, X of the data elements are read and output again. The repeated output data can provide for resynchronization of the cryptographic device as explained above.

Alternatively, multiple read pointers can be maintained. A first read pointer can be used to keep track of a current memory location from which data is being read. A second read pointer can be used to keep track of the start of the next block of data for output. Thus, the first read pointer can be advanced while outputting the block (e.g., incrementing by one before or after each data element is read), the second read pointer can be advanced by M-X before or after each data block, and the first read pointer can be set to equal the second read pointer before or after each data block.

Note that N need not be constant for each block of data which is input into the data buffer 302. For example, N can be different for each communication link and thus vary from block to block. For example in some embodiments, the system can accept input data from the communications links on a periodic round-robin basis. In such an embodiment, N can be smaller for communications links operating at a lower data rate as compared to communications links operating at a higher data rate. As a specific example, for a 10 millisecond period, a communications link operating at 8 kilobits-per-second will produce a block size of N=10 bytes (1 byte=8 bits), whereas a communications link operating at 1.544 megabits-per-second will produce a block size of N=1,930 bytes.

N need not be constant for a given communications link. For example, a communications link may have a varying data rate. In such an embodiment, N can vary even though the round-robin period is constant as more or fewer data elements are received within a fixed time interval. As another example, a communications link may provide a fewer or less data elements relative to a fixed block period in the system 300 due to clock drift or range delay changes of the communications link relative to the system 300.

The communications links need not be synchronized to each other or to the operation of the system 300. In other words, the communications links can operate asynchronously relative to each other. Switching between blocks of input data can also operate asynchronously relative to the communications links. This is because the switching can be done without regard to any block boundaries on the communications links. Indeed, synchronizing switching to any data structure of the communications links may be impractical since the links are encrypted, and thus appear to be effectively random data. Thus, N can vary for each communications link and N can vary between communications links. Similarly, M need not be constant either, and can vary from block, changing with time for one communications link, or being different for different communications links.

Figure 4:
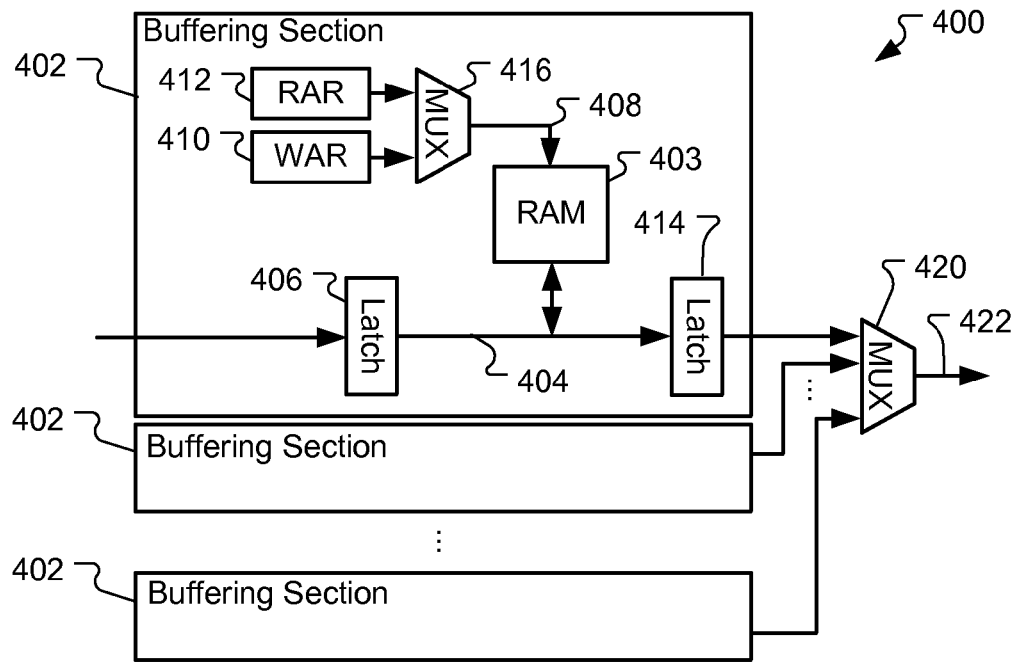
FIG. 4 is a block diagram of another example of a system for sharing a cryptographic device among a plurality of communications link in accordance with some embodiments of the invention.

FIG. 4 illustrates another embodiment of a system 400 for sharing a cryptographic device. The system can share the cryptographic device among a plurality (e.g., a number P) of communications links, and can include a plurality (e.g., a number P) of corresponding buffering sections 402. The buffering sections (one of which is shown in detail) can each include a random access memory (RAM) 403. The RAM can be, for example, a memory chip or memory section of a field programmable gate array (FPGA) or application specific integrated circuit (ASIC). The RAM can be an example of a means for buffering data. The random access memory can provide similar capabilities as the data buffer 302 described above. Data can be input and output from the data buffer via a data bus 404, being read or written from/to the RAM using read/write control(s) (not shown). While a single bi-directional data bus is shown, separate read and write busses can alternatively be used.

Input data from the communications link can, for example, be provided to an input latch 406, and written into the RAM 403 at a memory address specified by an address bus 408. For example, the write address can be specified by a write address register (WAR) 410. The write address can advance as described above. The write address register and associated write control (not shown) to the RAM can be an example of a means for writing blocks of input data.

Output data can, for example, be output from the RAM 403 from a memory address specified by a read address register (RAR) 412, and provided to an output latch 414. The read address can advance to provide overlaps between output data blocks as described above. The read address register and associated read control (not shown) to the RAM can be example of a means for reading blocks of output data.

The read address register 412 and write address register 410 can be implemented in discrete logic, circuitry within an FPGA or ASIC, or using a processor as described further below. Circuitry (e.g., adders, not shown) can be coupled to the read address register and write address register to advance the addresses as described above. Switching between the read and write address can be provided by a multiplexer 416. While a single address bus is shown, separate read and write address busses can alternatively be used (eliminating the multiplexer). A multiplexer can be, for example, a multiplexer chip, a tri-state bus, or the like.

The data output from the multiple buffering sections 402 can be multiplexed together, for example, by an output multiplexer 420 which can provide an output interface 422 to the cryptographic device.

Sequencing of input from the different channels can be accomplished in various ways. For example, writing into the buffering sections 402 can occur asynchronously relative to each other, and can be initiated in various ways. For example, writing into a buffer section can be controlled by control signals (not shown) provided from the communications links (e.g., a data clock, a data ready signal, etc.). As another example, one or more sequencer(s) (not shown) can periodically check for data availability from each communications link, and transfer available data into the buffering sections 402.

Sequencing of output to the cryptographic device from the buffering sections 402 can also be accomplished in various ways. For example, output can be initiated based on an amount of data in the RAMs 403 (e.g., to avoid overflowing the RAMs, or to provide a minimum predefined latency for each channel) or output can be initiated at a regular time interval.

Data can be input from the plurality of communications links to the buffering sections 402 at different data rates. For example, each communications link may provide an average input data rate into the buffering sections. Output from the buffering sections can be bursted to the output interface 422 at rates which are higher than the average input data rates. As a specific example, communications link data rates can be between 100 bits-per-second and 100 mega-bits-per-second, while burst rates to the output interface can be 1 giga-bit-per-second. In general, data input into the buffer at a rate $R_x$ for communications link x can be output to the cryptographic device at a rate $R_p$, wherein $R_p > R_x$, and $R_p > \Sigma R_x$, x=1 . . . $N_{links}$, wherein $N_{links}$ is the number of communications links. The data output rate to the cryptographic device can generally be greater than the sum of the input rates due to the additional overhead of the repeated tail/head portions.

Control of the reading/writing can be accomplished in various ways. For example, a sequencer (not shown) can be connected to the multiplexers 416 selection controls (not shown), input latches 406 strobe (not shown), output latches 414 strobe (not shown), output multiplexer 420 selection control (not shown), and RAM 403 read/write controls (not shown) to control the operation of the buffering sections 402. A separate sequencer can be associated with each buffering section, or one sequencer can control the entire system 400. The sequencer can accept inputs (not shown) such as data read flags, data clocks, clocks, and the like to control operation. The sequencer(s) can be implemented in a state machine, for example using discrete logic, a FPGA, an ASIC, a processor, or using similar techniques. For example, a processing system can be used as described in further detail below.

Figure 5:
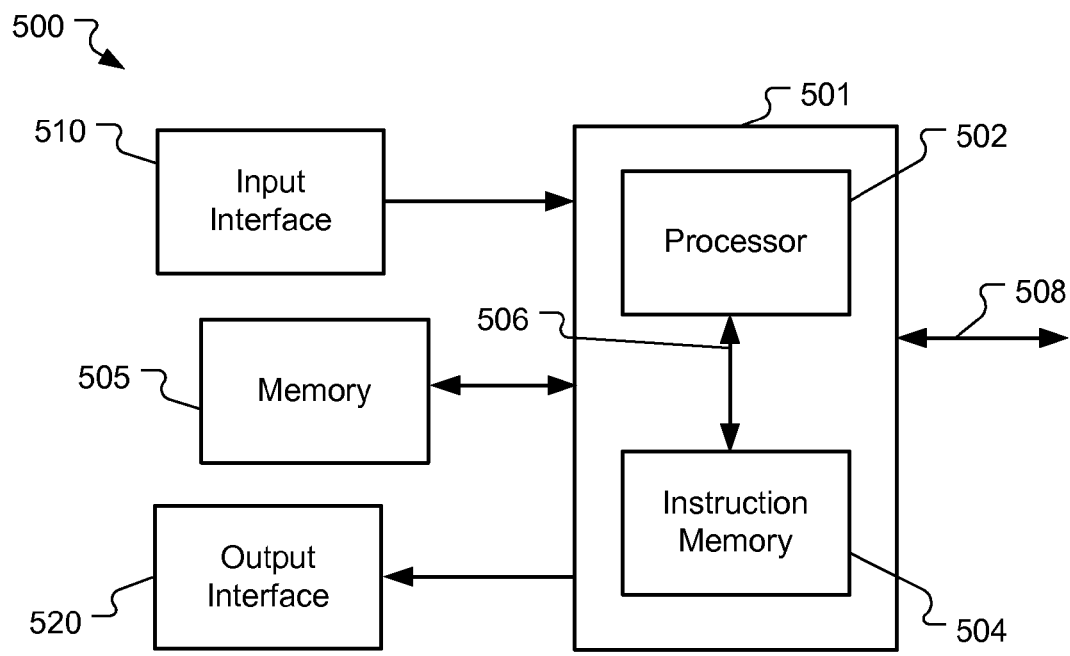
FIG. 5 is a block diagram of a computer system which can be used to implement all or part of a system and method for sharing a cryptographic device among a plurality of communications links in accordance with some embodiments of the present invention.

In some embodiments, all or part of a means for buffering data, means for writing blocks of input data, and a means for reading blocks of output data can be implemented using a specialized or general purpose processor controlled by software (e.g., machine executable instructions stored in a machine readable media). For example, FIG. 5 illustrates a computer system 500 which can be used to implement one or more parts of a system for sharing a cryptographic device. The computer system can include a general-purpose or special-purpose processing subsystem 501. For example, the computer system can be a personal computer, a notebook computer, a personal digital assistant (PDA) or other handheld device (e.g., a cellular telephone), a workstation, a minicomputer, a mainframe, a supercomputer, a multi-processor system, a network computer, a processor-based electronic device, or the like. The processing subsystem can include a processor 502 and an instruction memory 504. The processor can be capable of executing computer-executable instructions received from the instruction memory via a bus 506 or similar interface. The processor can be a single processor or multiple processors (e.g., a central processor and one or more other processors designed to perform a particular function or task). The instruction memory can be integrated into the same semiconductor device or package as the processor, or can be a mixture of external memory and memory integrated into the processor. The bus can be configured to connect various components of the computer system, and can include any of a variety of bus structures including a memory bus or memory controller, a peripheral bus, or a local bus that uses any of a variety of bus architectures. The bus can be used to interconnect the processor, instruction memory, and other components, such as mass storage devices, input/output interfaces, network interfaces, and the like. Coupled to the processing subsystem can also be memory 505 (which, like the instruction memory, can be wholly or partly integrated into the processor). The memory can be used for data storage, as discussed in further below. The instruction memory 504 and the memory 505 can be the same physical memory (e.g., using different address space within a memory chip) or can be provided by separate devices (e.g., using different address and data busses).

As describer further below, computer-executable instructions can cause the processor 502 to execute functions to implement blocks of a software program for sharing a cryptographic device among a plurality of communications links. The computer-executable instructions can be permanently stored in the instruction memory 504 or temporarily stored in the instruction memory and loaded into the instruction memory from a computer-readable medium, for example, via an interface 508 or through other techniques. The computer-executable instructions can include data structures, objects, programs, routines, or other program modules that can be accessed by the processor. For example, computer executable instructions can include operating system instructions used to establish communication or enable loading of programs, such as during start-up of the computer system. In general, computer-executable instructions cause the processor to perform a particular function or group of functions and are examples of program code means for implementing methods disclosed herein. Furthermore, a particular sequence of the executable instructions provides an example of corresponding acts that can be used to implement the operations of such methods.

Examples of computer-readable media include random-access memory (RAM), read-only memory (ROM), programmable read-only memory (PROM), erasable programmable read-only memory (EPROM), electrically-erasable programmable read-only memory (EEPROM), compact disk read-only memory (CD-ROM), digital video disk (DVD), magnetic medium, or any other device or component that is capable of providing data or executable instructions that can be accessed by a processor. Computer-readable media can be a non-transitory media (e.g., a physical device as described above) which allows for permanent, semi-permanent, or temporary storage of executable instructions.

The computer system 500 can include various input/output interfaces, including for example an input interface 510 which can be used to accept data from plurality of communications links. The input interface can use, for example, a serial interface, a parallel interface, a universal serial bus (USB) interface, a firewire interface (IEEE 1394), and the like. The computer system can also include an output interface 520 which can be used to provide data to the cryptographic device. The output interface can be the same as or different from the input interface.

In some embodiments, the computer system 500 can be used to control the sequencing of reading/writing data, for example in the system 400 of FIG. 4. For example, the computer system can implement a sequencer as described above, using the input interface 510 to accept inputs such as data read flags, data clocks, clocks, etc. and using the output interface 520 to provide selection controls, latch strobes, read/write controls, etc.

In other embodiments, the computer system 500 can be used to implement portions or all of any of: a means for buffering data, a means for writing blocks of input data, and a means for reading blocks of output data in distinct software modules. The software modules can include instructions to cause the processor 502 to implement the modules. For example, the instructions can correspond to the flow chart of FIG. 6 to provide a computer-implemented method for sharing a cryptographic device among a plurality of communications links. For example, the software modules can include a write module and a read module. The write module can cause the processor to accept data from the input interface 510 for a plurality of communications links, and store the data into the memory 505. The processor in conjunction with the instructions of the write module can thus be an example a means for writing blocks of input data. The read module can cause the processor to read blocks of data from the memory 505 and output the data to the output interface 520 for transfer to cryptographic device. As discussed above, each block of output data can include a head portion which is a repeat of the tail portion for a previous block of output data associated with the same one of the plurality of communication links. The processor in conjunction with the instructions of the read module can thus be an example of a means for reading blocks of output data. The computer system 500 can also provide a means for buffering data. For example, data can be stored in the memory 505.

Figure 6:
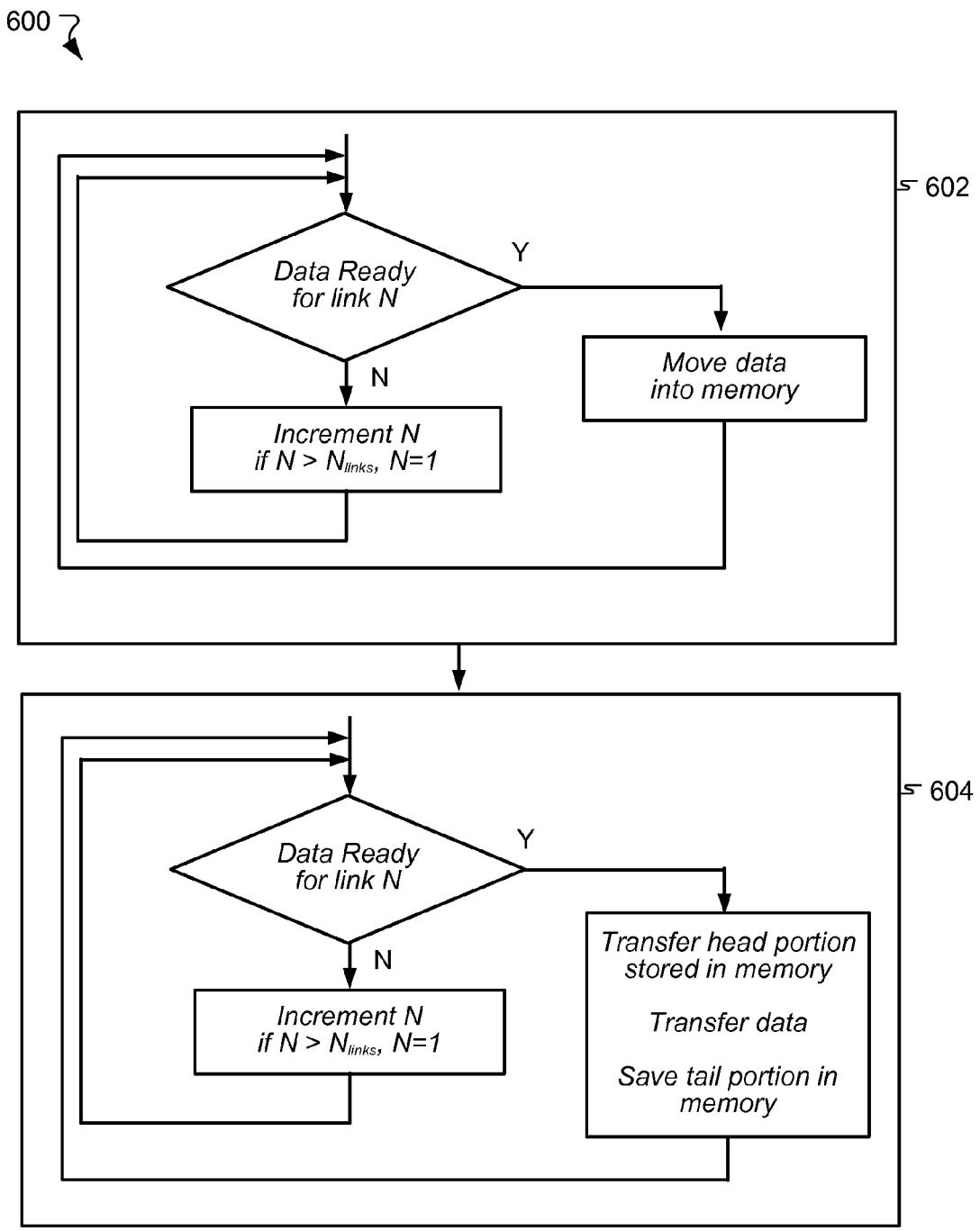
FIG. 6 is a flow chart of a method for sharing a cryptographic device among a plurality of communications links in accordance with some embodiments of the present invention.

Turning again to the flow chart of FIG. 6, one example of a method 600 for sharing a cryptographic device which can be implemented using the computer system 500 will be illustrated. The method can include buffering 602 data for a plurality of communications links within a memory (e.g., memory 505). Various ways of implementing the buffering can be used. For example, as shown here, the processor can cycle among the communications links, checking to see if there is input data available for each communications link, and when data is available, moving the data into memory. Alternatively, an interrupt type system can be used, where an interrupt routine causes the processor to transfer data on demand. As yet another example, a direct memory access system can be used to transfer input data from the communications channels into the memory without involvement of the processor. Thus, each of the foregoing can be additional examples of a means for writing blocks of input data.

Another operation in the method 600 can include transferring 604 data to the cryptographic device. Various way of implementing the transferring can be used. For example, as shown here, the processor can cycle among the communications links, checking to see if data is ready to be transferred to the cryptographic device. For example, data can be ready based on any of a number of different criteria. Data can be transferred when a predefined number of data elements have been buffered for a given link. Alternatively, data can be transferred for each link at a predefined time interval. As yet another example, data can be transferred when the cryptographic device has completed processing a previous block of data As another example, transferring 604 data to the cryptographic device can use an interrupt type system. As yet another example, a direct memory access system can be used to transfer output data from the memory to the cryptographic device without involvement of the processor. Thus, each of the foregoing can be additional examples of a means for reading blocks of output data.

When data is ready to be transferred to the cryptographic device for a particular link, the transferring can include writing a head portion which corresponds to a tail portion previously stored for that link. Additional data elements can then be transferred, and a tail portion saved (which will be transferred as a head portion in the future).

The buffering data 602 and transferring data 604 can occur sequentially, for example, as suggested by FIG. 6 above. Alternatively, the buffering data and transferring data can occur simultaneously, for example, being executed by different processors. As another example, the buffering data can occur substantially simultaneously, for example, being executed by the same processor but in separate time-shared processing threads. Context switching between the buffering and the transferring can be driven by any of: a regular time slice, an interrupt, a flag/semaphore, and the like.

If desired, a control block can be provided which coordinates and schedules the buffering data 602 and the transferring data 604. For example, the control block can schedule regular processing for each communications link. A regular processing schedule can, for example, help to manage latency on the communications links. If desired, priority queuing can be provided, wherein data for some (e.g., high priority) channels is provided to the cryptographic devices preferentially over other (e.g., low priority) channels.

Figure 7:
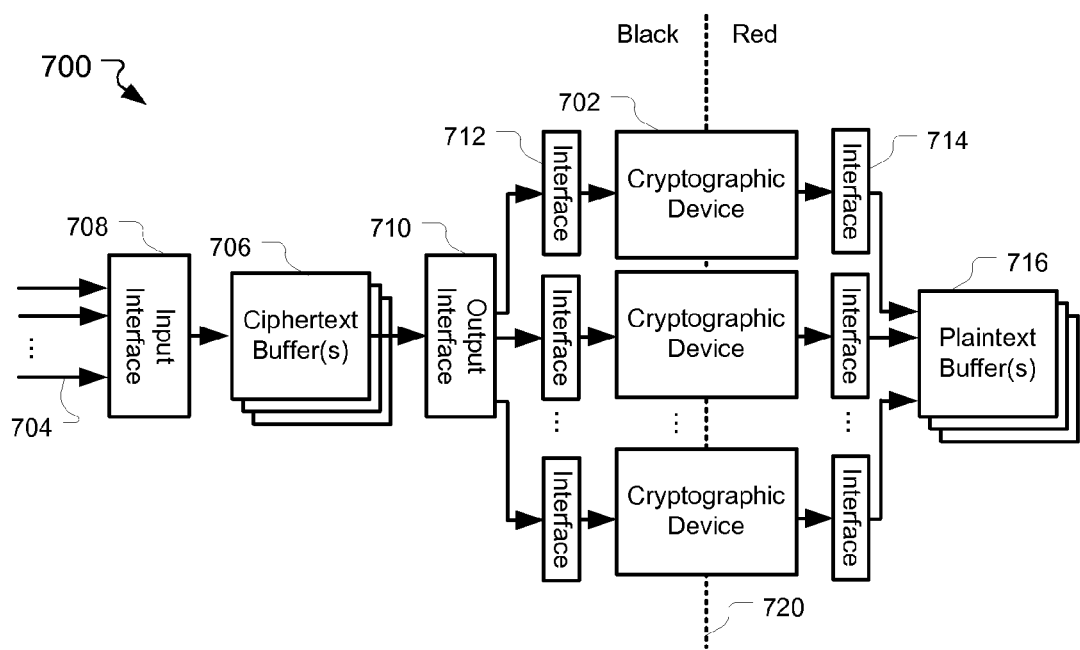
FIG. 7 is a block diagram of another example of a system for sharing a cryptographic device among a plurality of communications link in accordance with some embodiments of the invention.

While the foregoing discussion has focused on the sharing of a single cryptographic device, it will be appreciated that multiple cryptographic devices can be shared in a similar manner. For example, as shown in FIG. 7, a system 700 can use multiple cryptographic devices 702 which are shared among multiple communications links 704. The number of cryptographic devices can be less than, equal to, or greater than, the number of communications links. Data from the communications links can be buffered in one or more ciphertext buffers 706. For example, one ciphertext buffer can be shared among all of the communications links, or separate ciphertext buffers can be provided for each communications link. Various ways of writing the data into the buffers, for example as described above, can be used by an input interface 710. Thus, the ciphertext buffers can be an example of a means for buffering data, and the input interface can be an example of a means for writing blocks of input data.

Data can be read from the ciphertext buffers 706 through an output interface 710 in blocks where blocks for each channel have header portions corresponding to tail portions of previous blocks for the same channel. Thus, the output interface can be an example of a means for reading blocks of data. The data can be provided through interfaces 712 to the cryptographic devices 702. For example, data can be provided to the cryptographic devices on a round-robin basis. If desired, the cryptographic devices can be managed as a pool of resources, and allocated for use by the communications links on a dynamic, as-needed basis. Note that no fixed mapping between the communications links and the cryptographic devices need be defined. For example, a particular one of the communications links can be processed by a different one of the cryptographic devices at different times. In other words, different blocks of data for a particular one of the communications links can pass through different ones of the cryptographic devices.

In some embodiments, not all of the cryptographic devices may be loaded with the same key. For example, a first subset of the devices having a first key (or set of keys) can be used to decrypt data from links using the first key, while a second subset of the devices can have a second key and be used to decrypt data from links using the second key. This can help to reduce overhead associated with key re-loading when switching from one communications link to another communications link.

Data output from the cryptographic devices 702 can be accepted by the system 700 through interfaces 714 and stored in one or more plaintext buffers 716. For example, one plaintext buffer can be shared among all of the communications links, or separate plaintext buffers can be provided for each communications link. Data stored in the plaintext buffers can be output to other systems for processing.

In some embodiments, special design considerations for handling and protecting ciphertext and plaintext may be imposed. Accordingly, the system can be separated into a "red" portion which handles plaintext and a "black" portion which handles ciphertext as shown by dividing line 720. Shielding and other separation techniques can be included to ensure that "red" (plaintext) data is not improperly emitted from the red portion of the system.

Summarizing and reiterating to some extent, examples of techniques for sharing a cryptographic device among a plurality of communications links have been illustrated. These techniques can provide a number of benefits in some embodiments. For example, since a single cryptographic device can be shared among a number of communications links, a communications node may be able to use less hardware, helping to reduce size, weight, and power of the communications node. Because the cryptographic device can be re-synchronized by reprocessing data (as described above), no internal access to the cryptographic device is needed to access state information. This allows the techniques to be used with cryptographic devices for which internal access is not desired (e.g., for red/black separation design considerations) or is not permitted (e.g., type 1 cryptographic devices). Moreover, because the techniques can be implemented asynchronously with respect to the communications links, no special over-the-air synchronization information needs to be added to the data stream for the sharing. No complexity needs to be added to the communications links, helping to keep transmitters and receivers simple. Switching the cryptographic device from one of the communications links to another one of the communications links can therefore occur asynchronously (e.g., at any time) with respect to the communications links. Thus, the communications links can be processed in any order, and the order can change with time. Heterogeneous rates on the communications links can also be accommodated. Block sizes transferred into and out of the system need not be constant size, and can thus vary for a communication link with time and can vary between communications links. Moreover, the number of communications links being processed can also vary with time (e.g., between zero and a maximum number of communications links defined by the number of read/write pointers). Because no changes are required to the data transmitted over the air, existing transmitters can be used. The techniques can be retrofit into existing communications systems for which the data transmission formats are already defined.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method of sharing a self synchronizing cryptographic device among a plurality of communications links, the method comprising:
buffering in a memory at least a first set of data received from a first communications link, a third set of data received from a second communications link, and a second set of data received from the first communications link, wherein the first communications link is different than the second communications link;
transferring the entire first set of data, including a tail section of the first set of data, from the memory to the cryptographic device;
keeping a copy of the tail portion of the first set of data in the memory, wherein the tail portion of the first set of data is both transferred to the cryptographic device with the entire first set of data and kept in the memory;
thereafter transferring at least part of the third set of data from the memory to the cryptographic device; and
thereafter transferring the tail portion of the first set of data kept in the memory followed by the second set of data from the memory to the cryptographic device, wherein a data quantity of the tail portion of the first set of data is sufficient to reestablish automatically cryptographic synchronization of the cryptographic device.

2. The method of claim 1, wherein each of the first set of data and the second set of data comprises a fixed number of data elements.

3. The method of claim 1, wherein the first set of data comprises a different number of data elements than the second set of data.

4. The method of claim 1, wherein the transferring the third set of data comprises transferring a tail portion of a fourth set of data followed by the third set of data, wherein the fourth set of data was previously received from the second communications link, then buffered in the memory, and then transferred from the memory to the cryptographic device and the tail portion of the fourth set of data was thereafter held in the memory.

5. The method of claim 4, wherein the first set of data received from the first communications link comprises a different number of data elements than at least one of the third set of data or the fourth set of data received from the second communications link.

6. The method of claim 1, further comprising sequentially transferring datasets for different ones of the plurality of communications links to the cryptographic device, wherein each dataset comprises a head portion corresponding to a tail portion of a previously transferred dataset.

7. The method of claim 6, wherein the datasets comprise a variable number of data elements.

8. The method of claim 1, wherein the cryptographic device is a type 1 device.

9. The method of claim 1, wherein the first communications link operates asynchronously relative to the second communications link.

10. The method of claim 1, wherein timing of finishing the transferring of the first set of data received from the first communications link and starting the transferring of the third set of data occurs asynchronously with respect to the first communications link and the second communications link.

11. The method of claim 1, wherein:
the self synchronizing cryptographic device is configured to synchronize with a ciphertext stream after processing a predefined quantity of ciphertext, and
the tail portion of the first data set comprises the predefined quantity of ciphertext.

12. The method of claim 1, wherein:
the first set of data and the second set of data are encrypted data encrypted with a first encryption key, and
the third set of data are encrypted data encrypted with a second encryption key that is different than the first encryption key.

13. The method of claim 1 further comprising:
receiving the first set of data and the second set of data from the first communications link at a first data rate, and
receiving the third set of data from the second communications link at a second data rate that is different than the first data rate.

14. A terminal for sharing a cryptographic device among a plurality of communications links, the terminal comprising:

a hardware interface to a self-synchronizing cryptographic device;

a digital memory hardware device comprising a data buffer having an input and an output, wherein the output is coupled to the interface;

a plurality of data pointers stored in the digital memory, the data pointers pointing into the data buffer, a read pointer and a write pointer being defined for each one of a plurality of communications links connected to the input of the data buffer, wherein the write pointer, for each particular communications link, is advanced by N locations for each block of N data elements input into the data buffer from the particular communications link, and wherein the read pointer, for each particular communications link, is advanced by M-X locations for each block of M data elements output from the data buffer to the hardware interface to the cryptographic device for the particular communications link, wherein X is a number of data elements corresponding to a tail portion of one of the blocks of M data elements sufficient to reestablish automatically synchronization of the cryptographic device upon transfer to the cryptographic device of a subsequent one of the blocks of M data elements.

15. The terminal of claim 14, further comprising the cryptographic device.

16. The terminal of claim 15, wherein the cryptographic device is a type 1 device.

17. The terminal of claim 14, wherein the plurality of communications links comprises at least two communications links which operate asynchronously relative to each other.

18. The terminal of claim 14, wherein N varies from block to block.

19. The terminal of claim 14, wherein M varies from block to block.

20. The terminal of claim 14, wherein M varies from communications link to communications link.

21. The terminal of claim 14, wherein for each communications link a peak output rate from the data buffer is greater than an average input rate to the data buffer.

22. A terminal for sharing a cryptographic device among a plurality of communications links, the terminal comprising:
   an interface to a self-synchronizing cryptographic device;
   a means for buffering data;
   a means for writing blocks of input data for a plurality of communications links into the means for buffering data; and
   a means for reading blocks of output data for the plurality of communications links from the means for buffering data for transfer to the interface, wherein for each communications link, a head portion of each block of output data for the communication link is a copy of a tail portion of a preceding block of output data previously read by the means for reading and transferred to the interface for the same communication link, and wherein a data quantity of the head portion is a sufficient data quantity to reestablish automatically synchronization of the cryptographic device.

23. The terminal of claim 22, further comprising the cryptographic device.

24. The terminal of claim 23, wherein the cryptographic device is a type 1 device.

25. The terminal of claim 22, further comprising a plurality of interfaces, each corresponding to one of a plurality of self-synchronizing cryptographic devices.

26. The terminal of claim 22, wherein the plurality of communications links comprises at least two communications links which operate asynchronously relative to each other.

27. The terminal of claim 22, wherein a size of the blocks of data varies from block to block.

* * * * *